(12) United States Patent
Chan

(10) Patent No.: US 10,965,217 B2
(45) Date of Patent: *Mar. 30, 2021

(54) POWER CONVERSION APPARATUS

(71) Applicant: Acer Incorporated, New Taipei (TW)

(72) Inventor: Tzu-Tseng Chan, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,668

(22) Filed: Nov. 8, 2019

(65) Prior Publication Data

US 2020/0350823 A1 Nov. 5, 2020

(30) Foreign Application Priority Data

Apr. 30, 2019 (TW) .................................. 108115011

(51) Int. Cl.
*H02M 3/335* (2006.01)
*H02M 1/00* (2006.01)

(52) U.S. Cl.
CPC .................. *H02M 3/33507* (2013.01); *H02M 2001/0096* (2013.01)

(58) Field of Classification Search
CPC ............... H02M 3/335–42; H02M 2001/0096
See application file for complete search history.

(56) References Cited

U.S. PATENT DOCUMENTS

2011/0222319 A1* 9/2011 Marumo .......... H02M 3/33507
363/21.12
2019/0393795 A1* 12/2019 Odate ............... H02M 3/33592

* cited by examiner

*Primary Examiner* — Peter M Novak
(74) *Attorney, Agent, or Firm* — JCIPRNET

(57) ABSTRACT

A power conversion apparatus including a transformer, a power switch, a pulse width modulation (PWM) signal generator, an energy storage element, and a power circuit is provided. A primary winding of the transformer receives an input voltage from an external power source. An auxiliary winding of the transformer provides an auxiliary voltage. The power switch is coupled to the primary winding. The PWM signal generator generates a PWM signal to control on and off the power switch. The energy storage element is coupled to a power terminal of the PWM signal generator. The power circuit supplies power to the PWM signal generator and charges the energy storage element according to the auxiliary voltage. When a voltage of the energy storage element is greater than or equal to a threshold voltage, the power circuit stores backup power according to the auxiliary voltage. When the external power source stops providing the input voltage, the power circuit supplies power to the PWM signal generator and charges the energy storage element according to the backup power.

9 Claims, 4 Drawing Sheets

POWER CONVERSION APPARATUS

CROSS-REFERENCE TO RELATED APPLICATION

This application claims the priority benefit of Taiwan patent application serial no. 108115011, filed on Apr. 30, 2019. The entirety of the above-mentioned patent application is hereby incorporated by reference herein and made a part of this specification.

BACKGROUND

Technical Field

The disclosure relates to a power conversion apparatus. Specifically, the disclosure relates to a power conversion apparatus capable of extending a hold-up time length of the power conversion apparatus.

Description of Related Art

In a power conversion apparatus, an input voltage provided by an external power source could be rectified to a DC voltage suitable for many kinds of electronic apparatuses. Therefore, power converters are widely used in electronic apparatuses, such as computers, office automation equipment, industrial control equipment, and communication equipment.

In a power conversion apparatus based on the pulse width modulation (PWM) control, the primary side of the power conversion apparatus generally has a power switch and a PWM control chip. The PWM control chip is configured to control on and off of the power switch, so that the transformer in the power conversion apparatus may transfer electrical energy stored by the primary side to the secondary side of the power conversion apparatus and outputs the DC voltage to the electronic apparatus. In addition, the auxiliary winding of the transformer may provide power required by the PWM control chip for operation through the power terminal of the PWM control chip. Further, a voltage regulator capacitor is generally disposed at the power terminal of the PWM control chip.

Generally, after the power source of the power conversion apparatus is cut, the power conversion apparatus is required to continuously output the DC voltage to the electronic apparatus during a period of hold-up time, so as to lower the influence on the electronic apparatus caused by the sudden power off. Nevertheless, since the capacitance of the voltage regulator capacitor of the PWM control chip is usually small, when the power conversion apparatus is powered off suddenly, the PWM control chip is powered off as well and thus stops controlling on and off of the power switch. As such, the power conversion apparatus stops outputting the DC voltage in a significantly short period of time. Therefore, the insufficient hold-up time problem occurs in most of the existing power conversion apparatuses, and as such, operational stability of electronic apparatuses is lowered.

SUMMARY

Accordingly, the disclosure provides a power conversion apparatus capable of supplying power to a pulse width modulation (PWM) signal generator according to backup power stored by the power conversion apparatus when the power conversion apparatus is powered off, so as to extend the period of the hold-up time that the power conversion apparatus continuously provides an output voltage.

A power conversion apparatus in an embodiment of the disclosure includes a transformer, a first power switch, a PWM signal generator, an energy storage element, and a power circuit. The transformer has a primary winding and an auxiliary winding. The primary winding is configured to receives an input voltage from an external power source. The auxiliary winding is configured to provide an auxiliary voltage. The first power switch is coupled to the primary winding and is controlled by a PWM signal. The PWM signal generator is coupled to the first power switch and is configured to generate the PWM signal to control on and off of the first power switch. The energy storage element is coupled to a power terminal of the PWM signal generator. The power circuit is coupled to the auxiliary winding, the power terminal of the PWM signal generator, and the energy storage element and is configured to supply power to the PWM signal generator and charge the energy storage element according to the auxiliary voltage. When a voltage of the energy storage element is greater than or equal to a threshold voltage, the power circuit stores backup power according to the auxiliary voltage. When the external power source stops providing the input voltage, the power circuit supplies power to the PWM signal generator and charges the energy storage element according to the backup power.

In view of the above, the power conversion apparatus provided by the disclosure may supply power to the PWM signal generator according to the stored backup power when the power conversion apparatus is powered off. In this way, after the power conversion apparatus is powered off, the hold-up time that the power conversion apparatus continuously provides an output voltage is extended.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
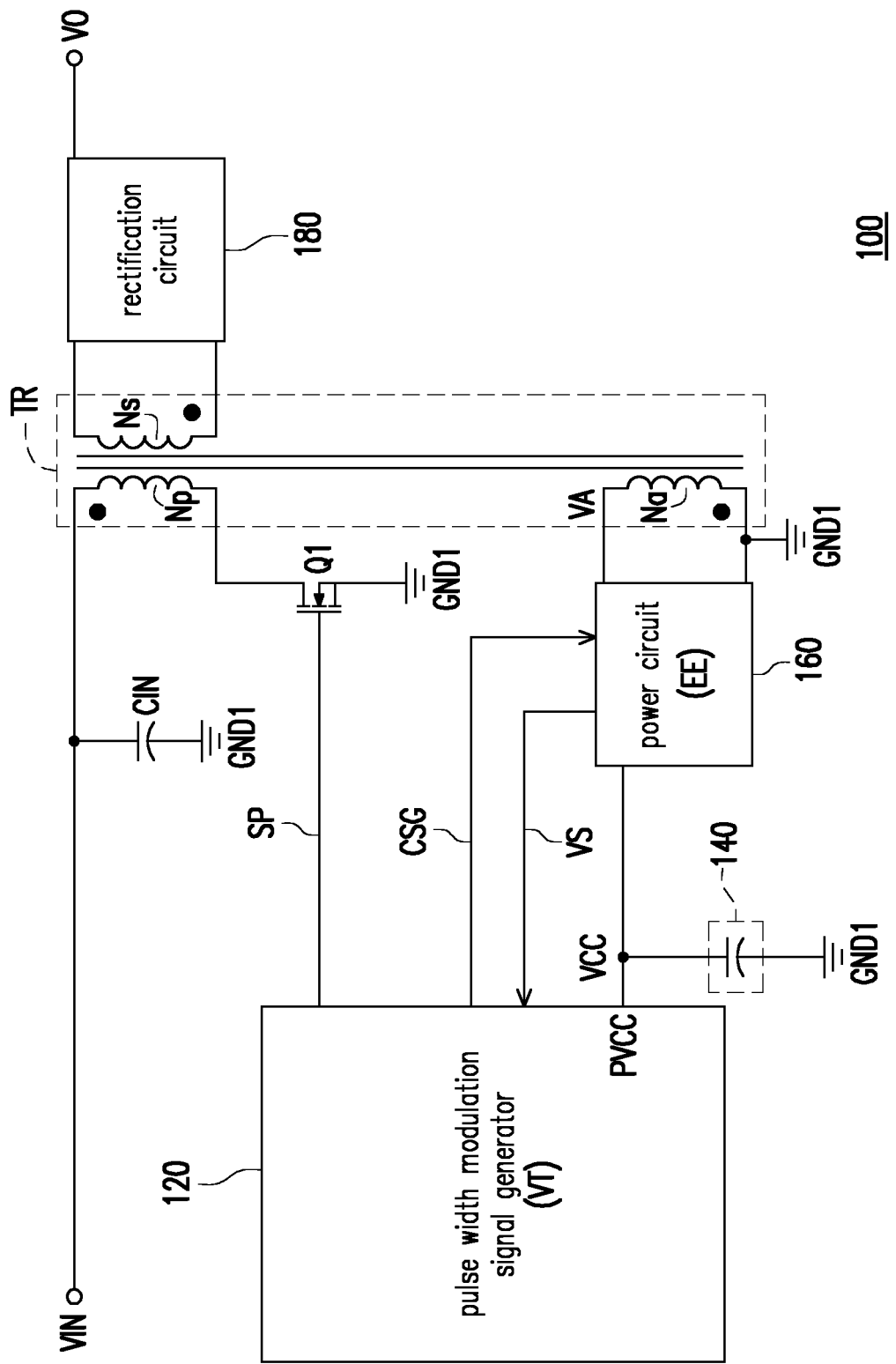
FIG. 1 is a schematic block diagram of circuits of a power conversion apparatus according to an embodiment of the disclosure.

In order to make the disclosure more comprehensible, several embodiments are described below as examples of implementation of the disclosure. Moreover, wherever possible, elements/components/steps with the same reference numerals are used to represent the same or similar parts in the drawings and embodiments.

FIG. 1 is a schematic block diagram of circuits of a power conversion apparatus 100 according to an embodiment of the disclosure. With reference to FIG. 1, the power conversion apparatus 100 may include a transformer TR, a power switch Q1, a pulse width modulation (PWM) signal generator 120, an energy storage element 140, and a power circuit 160, which should however not be construed as a limitation in the disclosure. In an embodiment of the disclosure, the power conversion apparatus 100 may further include an input capacitor CIN and a rectification circuit 180.

The transformer TR has a primary winding Np, a secondary winding Ns, and an auxiliary winding Na. The primary winding Np is configured to receives an input voltage VIN from an external power source. The secondary winding Ns is coupled to the rectification circuit 180 and is configured to provide an output voltage VO to a load. The auxiliary winding Na is configured to provide an auxiliary voltage VA.

The input capacitor CIN is coupled between a first terminal (e.g., a common-polarity terminal, i.e., a dotted terminal) of the primary winding Np and a ground terminal GND1. When the external power source supplies the input voltage VIN to the power conversion apparatus 100, the input capacitor CIN may store electrical energy. When the external power source stops supplying the input voltage VIN to the power conversion apparatus 100, the electrical energy stored by the input capacitor CIN may release energy to the secondary winding Ns.

The power switch Q1 is coupled between a second terminal (e.g., an opposite-polarity terminal, i.e., a non-dotted terminal) of the primary winding Np and the ground terminal GND1 and is controlled by a PWM signal SP. The PWM signal generator 120 is coupled to the first power switch Q1 and is configured to generate the PWM signal SP to control on and off of the first power switch Q1. As such, the transformer TR may transfer the electrical energy stored by the primary winding Np to the secondary winding Ns and provides the output voltage VO to the load through the rectification circuit 180. In an embodiment of the disclosure, the PWM signal generator 120 may be implemented by adopting a hardware circuit such as a micro-controller, an application-specific integrated circuit (ASIC), a programmable logic device (PLD), or a field programmable gate array (FPGA), but is not limited thereto.

The energy storage element 140 is coupled between a power terminal PVCC of the PWM signal generator 120 and the ground terminal GND1 and is configured to stabilize a voltage of the power terminal PVCC. In an embodiment of the disclosure, the energy storage element 140 may be implemented by adopting a capacitor, but is not limited thereto.

The power circuit 160 is coupled to the auxiliary winding Na, the power terminal PVCC of the PWM signal generator 120, and the energy storage element 140. The power circuit 160 may supply power to the PWM signal generator 120 and charge the energy storage element 140 according to the auxiliary voltage VA.

In particular, when a voltage VCC of the energy storage element 140 (i.e., the voltage of the power terminal PVCC of the PWM signal generator 120) is charged to be greater than or equal to a threshold voltage VT, the power circuit 160 may store backup power EE according to the auxiliary voltage VA. In addition, when the external power source stops supplying the input voltage VIN to the power conversion apparatus 100, the power circuit 160 may supply power to the PWM signal generator 120 and charge the energy storage element 140 according to the backup power EE. In this way, if the external power source stops supplying power to the power conversion apparatus 100, the backup power EE stored by the power circuit 160 may prolong the time for powering the PWM signal generator 120, so that hold-up time that the power conversion apparatus 100 continuously supplies the output voltage VO is thereby extended.

In an embodiment of the disclosure, the PWM signal generator 120 may detect the voltage VCC of the energy storage element 140 through the power terminal PVCC. When the voltage VCC of the energy storage element 140 is greater than or equal to the threshold voltage VT, the PWM signal generator 120 may output a control signal group CSG to the power circuit 160. As such, the power circuit 160 stores the backup power EE according to the auxiliary voltage VA in response to the control signal group CSG.

In an embodiment of the disclosure, the PWM signal generator 120 may detect a voltage VS of the backup power EE. When the voltage VS of the backup power EE is greater than or equal to the threshold voltage VT, it means that the power circuit 160 completes storage of the backup power EE, and the PWM signal generator 120 thereby stops outputting the control signal group CSG to the power circuit 160.

In an embodiment of the disclosure, the threshold voltage VT is a minimum voltage required by the PWM signal generator 120 for normal operation, which should however not be construed as a limitation in the disclosure.

Figure 2:
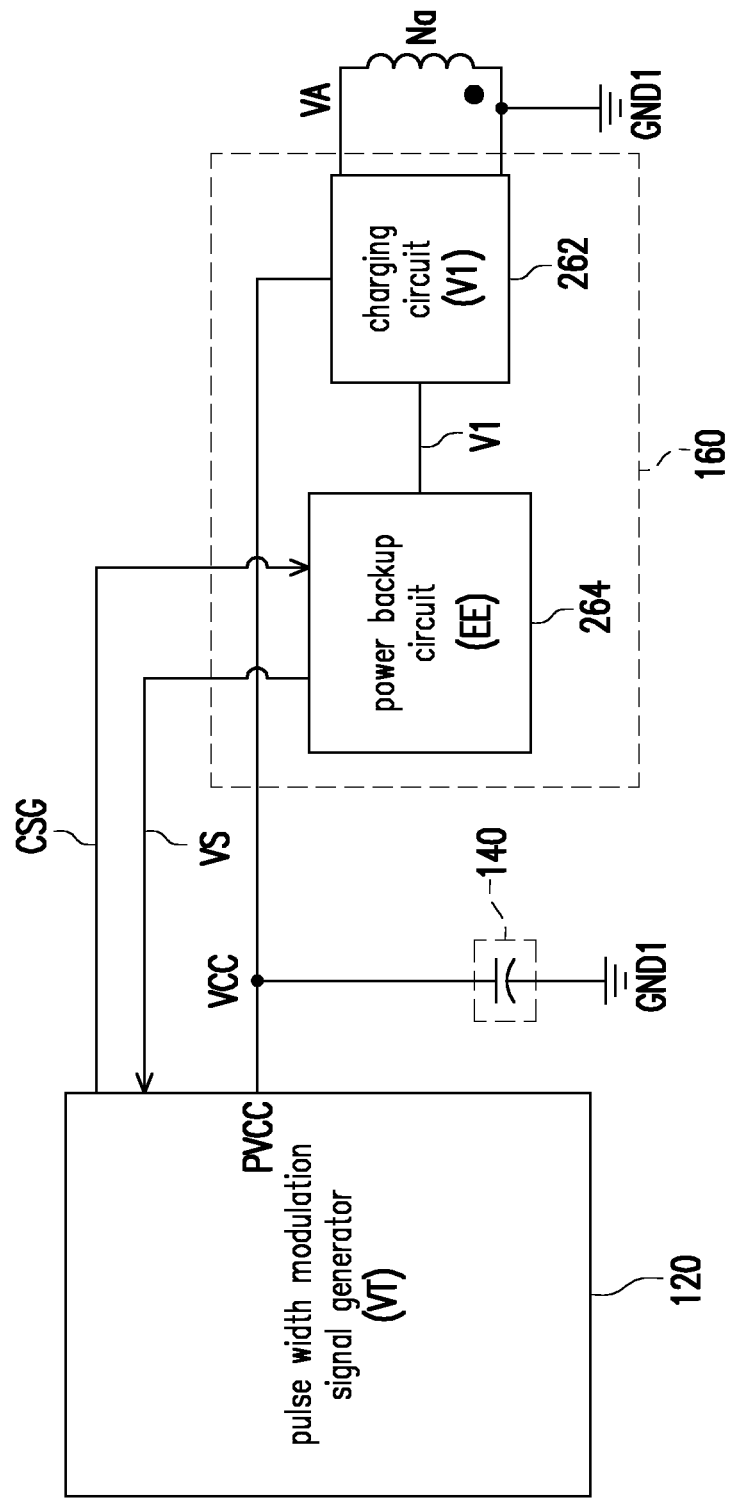
FIG. 2 is a schematic block diagram of a power circuit according to an embodiment of the disclosure.

FIG. 2 is a schematic block diagram of the power circuit 160 according to an embodiment of the disclosure. For ease of description, coupling relationships between the power circuit 160 and the auxiliary winding Na and the PWM signal generator 120 and the energy storage element 140 are also depicted in FIG. 2. With reference to FIG. 1 and FIG. 2 together, the power circuit 160 includes a charging circuit 262 and a power backup circuit 264. The charging circuit 262 is coupled to the auxiliary winding Na, the power terminal PVCC of the PWM signal generator 120, and the energy storage element 140. The charging circuit 262 may rectify and filter the auxiliary voltage VA to generate a first voltage V1, and may supply power to the PWM signal generator 120 and charge the energy storage element 140 according to the first voltage V1.

The power backup circuit 264 is coupled to the charging circuit 262, the power terminal PVCC of the PWM signal generator 120, and the energy storage element 140. When the voltage VCC of the energy storage element 140 (i.e., the voltage of the power terminal PVCC of the PWM signal generator 120) is charged to be greater than or equal to the threshold voltage VT, the PWM signal generator 120 may output the control signal group CSG to the power backup circuit 264, so that the power backup circuit 264 stores the backup power EE based on the first voltage V1. In addition, the PWM signal generator 120 may detect the voltage VS of the backup power EE. When the voltage VS of the backup power EE is charged to be greater than or equal to the threshold voltage VT, it means that the power backup circuit 264 is fully charged, and the PWM signal generator 120 thereby stops outputting the control signal group CSG to the power backup circuit 264. Further, when the external power source stops supplying the input voltage VIN, the power backup circuit 264 may supply power to the PWM signal generator 120 and charge the energy storage element 140 according to the backup power EE, and that the time for powering the PWM signal generator 120 is extended.

Figure 3:
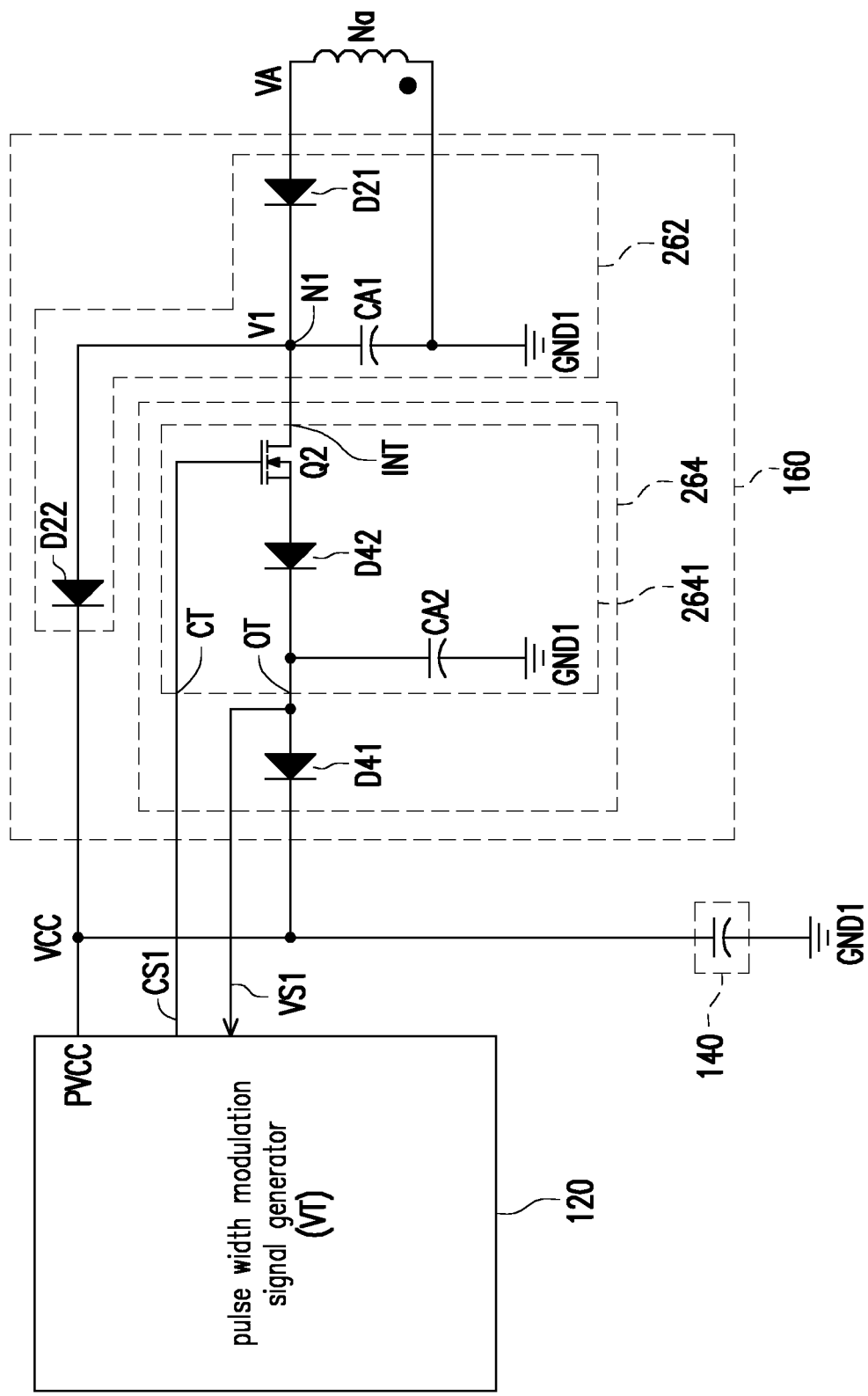
FIG. 3 is a schematic diagram illustrating circuit architectures of a charging circuit and a power backup circuit according to an embodiment of the disclosure.

FIG. 3 is a schematic diagram illustrating circuit architectures of the charging circuit 262 and the power backup circuit 264 in the power circuit 160 according to an embodiment of the disclosure. For ease of description, the auxiliary winding Na, the PWM signal generator 120, and the energy storage element 140 are also depicted in FIG. 3. With reference to FIG. 1 and FIG. 3 together, the charging circuit 262 includes a diode D21, a diode D22, and an auxiliary capacitor CA1. A first terminal (i.e., a common-polarity terminal) of the auxiliary winding Na is coupled to the ground terminal GND1. An anode terminal of the diode D21 is coupled to a second terminal (e.g., an opposite-polarity terminal) of the auxiliary winding Na to receive the auxiliary voltage VA. A cathode terminal of the diode D21 is coupled to a first node N1 and provides the first voltage V1. An anode terminal of the diode D22 is coupled to the first node N1. A cathode terminal of the diode D22 is coupled to the power terminal PVCC of the PWM signal generator 120 and the energy storage element 140. A first terminal of the auxiliary capacitor CA1 is coupled to the ground terminal GND1. A second terminal of the auxiliary capacitor CA1 is coupled to the first node N1.

The power backup circuit 264 may include an energy storage circuit 2641 and a diode D41. The energy storage circuit 2641 is connected in series between the charging circuit 262 and the anode terminal of the diode D41 and is configured to store the backup power EE. A cathode terminal of the diode D41 is coupled to the power terminal PVCC of the PWM signal generator 120 and the energy storage element 140.

In this embodiment, the control signal group CSG includes a control signal CS1. When the voltage VCC of the energy storage element 140 is greater than or equal to the threshold voltage VT, the PWM signal generator 120 outputs the control signal CS1 to the energy storage circuit 2641, and the energy storage circuit 2641 stores electrical energy to serve as the backup power EE according to the first voltage V1 in response to the control signal CS1. The PWM signal generator 120 may detect a voltage VS1 of the electrical energy stored by the energy storage circuit 2641. When the voltage VS1 of the electrical energy stored by the energy storage circuit 2641 is greater than or equal to the threshold voltage VT, the PWM signal generator 120 may stop outputting the control signal CS1 to the energy storage circuit 2641, and the energy storage circuit 2641 completes storage of the electrical energy. In addition, when the external power source stops providing the input voltage VIN, the energy storage circuit 2641 may supply power to the PWM signal generator 120 and charge the energy storage element 140 with the backup power EE through the diode D41.

Further, the energy storage circuit 2641 has an input terminal INT, a control terminal CT, and an output terminal OT. The input terminal INT of the energy storage circuit 2641 is coupled to the charging circuit 262 to receive the first voltage V1. The output terminal OT of the energy storage circuit 2641 is coupled to the anode terminal of the diode D41 and the PWM signal generator 120. The control terminal CT of the energy storage circuit 2641 receives the control signal CS1. In this embodiment, the energy storage circuit 2641 includes a power switch Q2, a diode D42, and an energy storage capacitor CA2. A first terminal and a control terminal of the power switch Q2 respectively serve as the input terminal INT and the control terminal CT of the energy storage circuit 2641. An anode terminal of the diode D42 is coupled to a second terminal of the power switch Q2. A first terminal of the energy storage capacitor CA2 and a cathode terminal of the diode D42 are coupled to each other to serve as the output terminal OT of the energy storage circuit 2641. A second terminal of the energy storage capacitor CA2 is coupled to the ground terminal GND1.

Operational details of the charging circuit 262 and the power backup circuit 264 of FIG. 3 are described as follows.

With reference to FIG. 1 and FIG. 3 again, when the external power source starts providing the input voltage VIN to the power conversion apparatus 100, the auxiliary winding Na may charge the auxiliary capacitor CA1 through the diode D21 and provide the first voltage V1 at the first node N1. Further, the auxiliary winding Na may charge the energy storage element 140 through the diodes D21 and D22.

The PWM signal generator 120 may detect the voltage VCC of the energy storage element 140 through the power terminal PVCC. When the PWM signal generator 120 detects that the voltage VCC of the energy storage element 140 is charged to be greater than or equal to the threshold voltage VT, the PWM signal generator 120 may output the control signal CS1 having a logic high level to turn on the power switch Q2. As such, the auxiliary winding Na starts charging the energy storage capacitor CA2 through the diodes D21 and D42 to serve as the backup power EE.

In addition, the PWM signal generator 120 may detect the voltage VS1 of the energy storage capacitor CA2 through the output terminal OT of the energy storage circuit 2641. When the voltage VS1 of the energy storage capacitor CA2 is greater than or equal to the threshold voltage VT, it means that the energy storage capacitor CA2 is fully charged and the PWM signal generator 120 may thereby stop outputting the control signal CS1 or may output the control signal CS1 having a logic low level to turn off the power switch Q2.

From another perspective, when the external power source stops providing the input voltage VIN, the auxiliary winding Na stops supplying power to the PWM signal generator 120 and stops charging the energy storage element 140, as such, the voltage VCC of the energy storage element 140 drops. When a voltage difference between the voltage VS1 of the energy storage capacitor CA2 and the voltage VCC of the energy storage element 140 is greater than a cut-in voltage of the diode D41 (i.e., a minimum voltage required by the diode D41 to be turned on), the diode D41 is turned on. As such, the electrical energy stored by the energy storage capacitor CA2 (i.e., the backup power EE) may be used to supply power to the PWM signal generator 120 and charge the energy storage element 140. In this way, the time for powering the PWM signal generator 120 is prolonged, so that the hold-up time that the power conversion apparatus 100 continuously supplies the output voltage VO is thereby extended.

Incidentally, the relationship between the logic high/low level of the control signal CS1 and on/off of the power switch Q2 is provided to serve as an example only. People having ordinary skill in the art know that the relationship between the logic high/low level of the control signal CS1 and on/off of the power switch Q2 may be defined by a designer according to practical needs.

Figure 4:
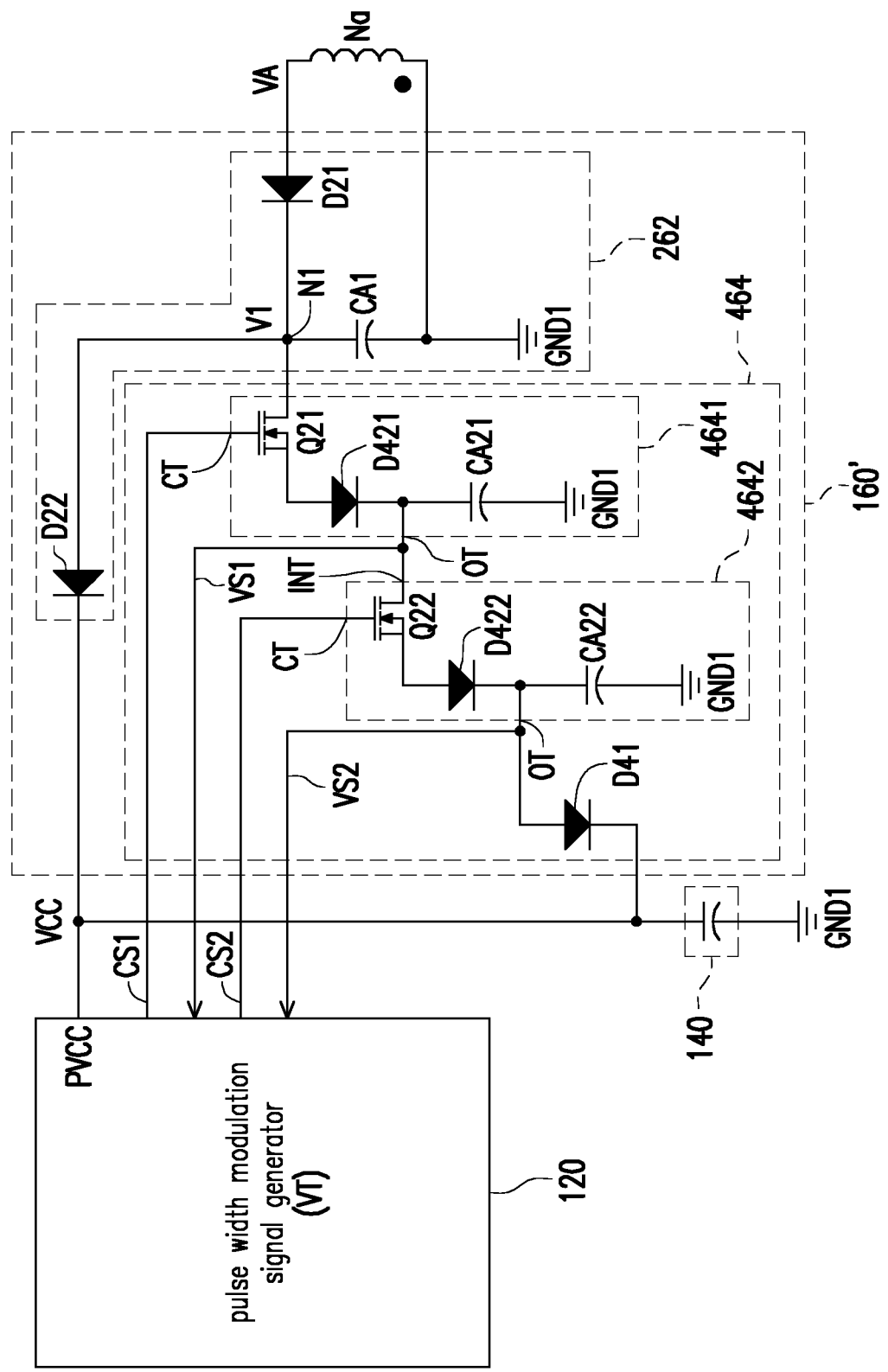
FIG. 4 is a schematic diagram illustrating circuit architectures of a charging circuit and a power backup circuit according to another embodiment of the disclosure.

FIG. 4 is a schematic diagram illustrating circuit architectures of a charging circuit 262 and a power backup circuit 464 in a power circuit 160' according to another embodiment of the disclosure. For ease of description, the auxiliary winding Na, the PWM signal generator 120, and the energy storage element 140 are also depicted in FIG. 4. With reference to FIG. 1, FIG. 3, and FIG. 4 together, the charging circuit 262 in FIG. 4 is similar to the charging circuit 262 in FIG. 3, so related description of FIG. 3 may be referred to, and repeated description is not provided herein.

In addition, compared to the power backup circuit 264 of FIG. 3 which has the diode D41 and one energy storage circuit 2641, the power backup circuit 464 of FIG. 4 has the diode D41 and two energy storage circuits 4641 and 4642. Specifically, the energy storage circuits 4641 and 4642 are connected in series in sequence and are connected in series between the charging circuit 262 and the anode terminal of the diode D41. The cathode terminal of the diode D41 is coupled to the power terminal PVCC of the PWM signal generator 120 and the energy storage element 140.

In this embodiment, the control signal group CSG may include control signals CS1 and CS2. When the voltage VCC of the energy storage element 140 is greater than or equal to the threshold voltage VT, the PWM signal generator 120 respectively outputs the control signals CS1 and CS2 to the energy storage circuits 4641 and 4642. The energy storage circuits 4641 and 4642 store electrical energy to serve as the backup power EE together according to the first voltage V1 in response to the control signals CS1 and CS2 respectively. The PWM signal generator 120 may detect voltages VS1 and VS2 of the electrical energy stored by each of the energy storage circuits 4641 and 4642. When the voltage VS2 of the electrical energy stored by the energy storage circuit 4642 is greater than or equal to the threshold voltage VT, the PWM signal generator 120 may stop outputting the corresponding control signal CS2 to the energy storage circuit 4642, and the energy storage circuit 4642 completes storage of the electrical energy. Similarly, when the voltage VS1 of the electrical energy stored by the energy storage circuit 4641 is greater than or equal to the threshold voltage VT, the PWM signal generator 120 stops outputting the corresponding control signal CS1 to the energy storage circuit 4641, and the energy storage circuit 4641 completes storage of the electrical energy. In addition, when the external power source stops providing the input voltage VIN, the energy storage circuits 4641 and 4642 may supply power to the PWM signal generator 120 and charge the energy storage element 140 with the backup power EE through the diode D41.

Further, each of the energy storage circuits 4641 and 4642 has the input terminal INT, the control terminal CT, and the output terminal OT. The input terminal INT of the first energy storage circuit 4641 is coupled to the charging circuit 262 to receive the first voltage V1. The output terminal OT of the first energy storage circuit 4641 is coupled to the input terminal INT of the second energy storage circuit 4642 and the PWM signal generator 120. The output terminal OT of the second energy storage circuit 4642 is coupled to the anode terminal of the diode D41 and the PWM signal generator 120.

The control terminal CT of the energy storage circuit 4641 receives the control signal CS1, and the control terminal CT of the energy storage circuit 4642 receives the control signal CS2. In this embodiment, the energy storage circuit 4641 includes a power switch Q21, a diode D421, and an energy storage capacitor CA21. A first terminal and a control terminal of the power switch Q21 respectively serve as the input terminal INT and the control terminal CT of the energy storage circuit 4641. An anode terminal of the diode D421 is coupled to a second terminal of the power switch Q21. A first terminal of the energy storage capacitor CA21 and a cathode terminal of the diode D421 are coupled to each other to serve as the output terminal OT of the energy storage circuit 4641. A second terminal of the energy storage capacitor CA21 is coupled to the ground terminal GND1. Similarly, the energy storage circuit 4642 includes a power switch Q22, a diode D422, and an energy storage capacitor CA22. A first terminal and a control terminal of the power switch Q22 respectively serve as the input terminal INT and the control terminal CT of the energy storage circuit 4642. An anode terminal of the diode D422 is coupled to a second terminal of the power switch Q22. A first terminal of the energy storage capacitor CA22 and a cathode terminal of the diode D422 are coupled to each other to serve as the output terminal OT of the energy storage circuit 4642. A second terminal of the energy storage capacitor CA22 is coupled to the ground terminal GND1.

Operational details of the charging circuit 262 and the power backup circuit 464 of FIG. 4 are described as follows. With reference to FIG. 1 and FIG. 4, when the external power source starts providing the input voltage VIN to the power conversion apparatus 100, the auxiliary winding Na may charge the auxiliary capacitor CA1 through the diode D21 and provide the first voltage V1 at the first node N1. Further, the auxiliary winding Na may charge the energy storage element 140 through the diodes D21 and D22.

The PWM signal generator 120 may detect the voltage VCC of the energy storage element 140 through the power terminal PVCC. When the PWM signal generator 120 detects that the voltage VCC of the energy storage element 140 is charged to be greater than or equal to the threshold voltage VT, the PWM signal generator 120 may output the control signals CS1 and CS2 having the logic high level to respectively turn on the power switches Q21 and Q22. As such, the auxiliary winding Na starts charging the energy storage capacitors CA21 and CA22 through the diodes D21, D421, and D422 to serve as the backup power EE together.

In addition, the PWM signal generator 120 may detect the voltage VS2 of the energy storage capacitor CA22 through the output terminal OT of the energy storage circuit 4642. When the voltage VS2 of the energy storage capacitor CA22 is greater than or equal to the threshold voltage VT, it means that the energy storage capacitor CA22 is fully charged, and the PWM signal generator 120 may thereby stop outputting the control signal CS2 or may output the control signal CS2 having the logic low level to turn off the power switch Q22. Similarly, the PWM signal generator 120 may detect the voltage VS1 of the energy storage capacitor CA21 through the output terminal OT of the energy storage circuit 4641. When the voltage VS1 of the energy storage capacitor CA21 is greater than or equal to the threshold voltage VT, it means that the energy storage capacitor CA21 is fully charged, and the PWM signal generator 120 may thereby stop outputting the control signal CS1 or may output the control signal CS1 having the logic low level to turn off the power switch Q21.

From another perspective, when the external power source stops providing the input voltage VIN, the auxiliary winding Na stops supplying power to the PWM signal generator 120 and stops charging the energy storage element 140, as such, the voltage VCC of the energy storage element 140 drops. When a voltage difference between the voltage VS2 of the energy storage capacitor CA22 and the voltage VCC of the energy storage element 140 is greater than the cut-in voltage of the diode D41, the diode D41 is turned on. As such, the electrical energy stored by the energy storage capacitor CA22 may be used to supply power to the PWM signal generator 120 and charge the energy storage element 140. In addition, when a voltage difference between the voltage VS1 of the energy storage capacitor CA21 and the voltage VS2 of the energy storage capacitor CA22 is greater than a cut-in voltage of the diode D422, the PWM signal generator 120 may turn on the power switch Q22. As such, the energy storage capacitors CA21 and CA22 supply power to the PWM signal generator 120 and charge the energy storage element 140 together.

Note that FIG. 3 serves as an example illustrating the power backup circuit 264 having the diode D41 and one energy storage circuit 641 and FIG. 4 serves as an example illustrating the power backup circuit 464 having the diode D41 and two energy storage circuits 4641 and 4642, but the disclosure does not intend to limit the number of the energy storage circuit in the power backup circuit. In other embodiments of the disclosure, the power backup circuit may include a diode and N energy storage circuit(s), where N may be any positive integer. The N energy storage circuit(s) is/are connected in series in sequence and is/are connected in series between the charging circuit and the anode terminal of the diode of the power backup circuit. Implementation and operational details related to the N energy storage circuit(s) may be deduced with reference to the related description of FIG. 3 and FIG. 4, and thereby, repeated description is not provided herein.

In view of the foregoing, the power conversion apparatus provided by the embodiments of the disclosure may supply power to the PWM signal generator according to the stored backup power when the power conversion apparatus is powered off, such that the hold-up time that the power conversion apparatus continuously provides the output voltage is extended.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power conversion apparatus, comprising:
    a transformer, having a primary winding and an auxiliary winding, wherein the primary winding is configured to receive an input voltage from an external power source, and the auxiliary winding is configured to provide an auxiliary voltage;
    a first power switch, coupled to the primary winding, and controlled by a pulse width modulation signal;
    a pulse width modulation signal generator, coupled to the first power switch, and configured to generate the pulse width modulation signal to control on and off of the first power switch;
    an energy storage element, coupled to a power terminal of the pulse width modulation signal generator; and
    a power circuit, coupled to the auxiliary winding, the power terminal of the pulse width modulation signal generator, and the energy storage element, and configured to supply power to the pulse width modulation signal generator and charge the energy storage element according to the auxiliary voltage, wherein the power circuit comprises:
        a charging circuit, coupled to the auxiliary winding, the power terminal of the pulse width modulation signal generator, and the energy storage element, configured to rectify and filter the auxiliary voltage to generate a first voltage, and supplying power to the pulse width modulation signal generator and charging the energy storage element according to the first voltage; and
        a power backup circuit, coupled to the charging circuit, the power terminal of the pulse width modulation signal generator, and the energy storage element, wherein the power backup circuit stores a backup power according to the first voltage when a second voltage of the energy storage element is greater than or equal to a threshold voltage, wherein the power backup circuit supplies power to the pulse width modulation signal generator and charges the energy storage element according to the backup power when the external power source stops providing the input voltage
    wherein the power circuit stores the backup power according to the auxiliary voltage when the second voltage of the energy storage element is greater than or equal to the threshold voltage, wherein the power circuit supplies power to the pulse width modulation signal generator and charges the energy storage element according to the backup power when the external power source stops providing the input voltage.

2. The power conversion apparatus as claimed in claim 1, wherein the pulse width modulation signal generator detects the second voltage of the energy storage element through the power terminal, wherein when the second voltage of the energy storage element is greater than or equal to the threshold voltage, the pulse width modulation signal generator outputs a control signal group to the power circuit, and the power circuit stores the backup power according to the auxiliary voltage in response to the control signal group.

3. The power conversion apparatus as claimed in claim 2, wherein the pulse width modulation signal generator is further configured to detect a third voltage of the backup power, wherein when the third voltage of the backup power is greater than or equal to the threshold voltage, the pulse width modulation signal generator stops outputting the control signal group to the power circuit, and the power circuit completes storage of the backup power.

4. The power conversion apparatus as claimed in claim 1, wherein the threshold voltage is a minimum voltage required by the pulse width modulation signal generator for normal operation.

5. The power conversion apparatus as claimed in claim 1, wherein a first terminal of the auxiliary winding is coupled to a ground terminal, and the charging circuit comprises:
    a first diode, an anode terminal of the first diode coupled to a second terminal of the auxiliary winding to receive the auxiliary voltage, and a cathode terminal of the first diode coupled to a first node and providing the first voltage;
    an auxiliary capacitor, a first terminal of the auxiliary capacitor coupled to the ground terminal, and a second terminal of the auxiliary capacitor coupled to the first node; and
    a second diode, an anode terminal of the second diode coupled to the first node, and a cathode terminal of the second diode coupled to the power terminal of the pulse width modulation signal generator and the energy storage element.

6. The power conversion apparatus as claimed in claim 1, wherein the power backup circuit comprises:
    a first diode, a cathode terminal of the first diode coupled to the power terminal of the pulse width modulation signal generator and the energy storage element; and
    N energy storage circuits, the N energy storage circuits connected in series in sequence, and connected in series between the charging circuit and an anode terminal of the first diode, wherein N is a positive integer,
    wherein when the voltage of the energy storage element is greater than or equal to the threshold voltage, the pulse width modulation signal generator outputs N control signals to the N energy storage circuits respectively, and the N energy storage circuits store electrical energy according to the first voltage to together serve as the backup power in response to the N control signals respectively, wherein the N energy storage circuits supply power to the pulse width modulation signal generator and charge the energy storage element with the backup power through the first diode when the external power source stops providing the input voltage.

7. The power conversion apparatus as claimed in claim 6, wherein:
the pulse width modulation signal generator is further configured to detect a fourth voltage of the electrical energy stored by each of the N energy storage circuits, wherein when the fourth voltage of the electrical energy stored by one of the N energy storage circuits is greater than or equal to the threshold voltage, the pulse width modulation signal generator stops outputting a corresponding one of the N control signals to the energy storage circuit, and the energy storage circuit completes storage of the electrical energy.

8. The power conversion apparatus as claimed in claim 6, wherein:
each energy storage circuit in the N energy storage circuits has an input terminal, a control terminal, and an output terminal, the input terminal of a first energy storage circuit in the N energy storage circuits is coupled to the charging circuit to receive the first voltage, the output terminal of a $M^{th}$ energy storage circuit of the N energy storage circuits is coupled to the input terminal of a $(M+1)^{th}$ energy storage circuit of the N energy storage circuits, the output terminal of an $N^{th}$ energy storage circuit of the N energy storage circuits is coupled to the anode terminal of the first diode, and the control terminal of each energy storage circuit of the N energy storage circuits receives one of the N control signals, wherein M is a positive integer less than N.

9. The power conversion apparatus as claimed in claim 8, wherein each energy storage circuit of the N energy storage circuits comprises:
a second power switch, a first terminal and a control terminal of the second power switch respectively serve as the input terminal and the control terminal of the energy storage circuit;
a second diode, an anode terminal of the second diode coupled to a second terminal of the second power switch; and
an energy storage capacitor, a first terminal of the energy storage capacitor coupled to a cathode terminal of the second diode to serve as the output terminal of the energy storage circuit, and a second terminal of the energy storage capacitor coupled to a ground terminal.

* * * * *